(12) United States Patent
Mudra et al.

(10) Patent No.: US 7,413,600 B2
(45) Date of Patent: Aug. 19, 2008

(54) COMPOSITION FOR OPAQUE COATING, LAMP WITH COATING, AND METHOD OF MANUFACTURE

(75) Inventors: István Mudra, Vác (HU); Péter Szemere, Budapest (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/707,694

(22) Filed: Feb. 15, 2007

(65) Prior Publication Data
US 2007/0148343 A1   Jun. 28, 2007

Related U.S. Application Data

(62) Division of application No. 10/862,620, filed on Jun. 7, 2004, now Pat. No. 7,195,667.

(51) Int. Cl.
*F21V 7/22* (2006.01)
*H01J 9/20* (2006.01)
*H01J 5/16* (2006.01)
*H01J 61/40* (2006.01)

(52) U.S. Cl. .................. 106/459; 106/456; 106/404; 106/286.3; 106/286.5; 106/287.23; 427/106; 427/108; 427/110; 427/168; 427/165; 427/169

(58) Field of Classification Search ............. 106/459, 106/456, 404, 286.3, 286.5, 287.23; 427/168, 427/19, 165, 106, 108, 110
See application file for complete search history.

(56) References Cited

U.S. PATENT DOCUMENTS 2,904,523 A * 9/1959 Hawkins, Jr. et al. ......... 524/25
3,776,473 A * 12/1973 Casey et al. ..................... 241/15
4,305,016 A    12/1981 Schmidt
4,965,039 A * 10/1990 Schuetz ....................... 264/553
6,221,138 B1 * 4/2001 Kenny ....................... 106/31.32
6,270,237 B1    8/2001 Scholler
6,666,913 B2 * 12/2003 Hirano et al. ............... 106/31.9

FOREIGN PATENT DOCUMENTS

| GB | 1193816 | 6/1970 |
| GB | 1334329 | 10/1973 |
| JP | 52-40740 | * 3/1977 |

* cited by examiner

*Primary Examiner*—C. Melissa Koslow
(74) *Attorney, Agent, or Firm*—Fay Sharpe LLP

(57) ABSTRACT

A composition for the manufacture of an opaque silvery coating on a glass surface is provided. The composition comprises a mixture of at least two metal powders. The metal powder mixture contains carbonyl iron and aluminum, and a carrier liquid for forming a suspension of the metal powder mixture. A method for manufacturing an opaque silvery coating for a lamp having a glass envelope is also provided. In the method, a suspension comprising a mixture of carbonyl iron and aluminum powders in a carrier liquid is applied onto the envelope of the lamp. The suspension is dried, and thereafter the composition remaining from the suspension is burned at a temperature above 500° C. A lamp with a glass envelope and a single layer opaque coating covering at least a part of the glass envelope is also disclosed. The opaque coating comprises 50 to 80 weight % carbonyl iron and 20 to 50 weight % elementary aluminum.

12 Claims, 2 Drawing Sheets

COMPOSITION FOR OPAQUE COATING, LAMP WITH COATING, AND METHOD OF MANUFACTURE

This is a divisional application of U.S. application Ser. No. 10/862,620, filed on Jun. 07, 2004, now U.S. Pat. No. 7,195,667, the disclosure of which is incorporated herein by reference.

BACKGROUND OF THE INVENTION

This invention relates to a composition for the manufacture of an opaque silvery coating on a glass surface, particularly on a lamp, and a method for manufacturing such an opaque silvery coating.

It is known in the art to apply an opaque coating to various parts of lamps having a glass envelope. A typical example is the covering of the tip of an automotive lamp, in order to prevent the emission of direct (non-reflected) light beams from the headlamp of a vehicle. The light emitted by a lamp in a vehicle headlight is projected onto the road in a controlled manner, so as to avoid the blinding of other drivers. Therefore, the light being emitted forward from the lamp directly, and which would not be controlled by the projection optics, is prevented from escaping the lamp by a metal cover shield, or by an opaque layer or coating applied directly to the lamp surface.

The use of such an opaque layer is described, among others, in U.S. Pat. No. 4,305,016 and No. 6,270,237. For example, U.S. Pat. No. 4,305,016 discloses that a suitable composition for forming the opaque layer is accomplished by mixing carbonyl iron and silicon powder, and further forming a suspension with butanol as a carrier liquid. The suspension is dried, and the metal powder mixture is burned to form a stable, hard and opaque coating. However, this coating has a substantially black color. Recently, the need has appeared to provide a silvery coating on the lamps instead of a black coating, primarily due to aesthetical reasons.

In order to satisfy this need, it is proposed to employ a dual layer on the lamp in U.S. Pat. No. 6,270,237. A metal layer providing a silvery appearance is suggested to be made of various metals, for example Ag, Al, Ni, etc. and mixtures thereof. Another layer with light-absorbing properties is placed between the metal layer and the glass. This layer is essentially black, and may be manufactured from Fe, Mn, Ti or Si. According to the disclosure in U.S. Pat. No. 6,270,237, the purpose of this light absorbing layer is to prevent the reflection of light from the metal layer toward the reflector surface. This arrangement has the disadvantage that the manufacturing steps required for the additional layer makes the production more expensive.

Therefore, it is desirable to provide a composition, which could be applied in a single layer only, and which would ensure the required properties of the opaque layer, namely a silvery appearance, sufficient opaqueness, small backscatter, combined with long term stability and ease of manufacture. Further, it is desirable to provide an appropriate method for manufacturing such an opaque layer.

SUMMARY OF THE INVENTION

In an exemplary embodiment of the present invention, a composition for the manufacture of an opaque silvery coating on a glass surface is provided. The composition comprises a mixture of at least two metal powders. The metal powder mixture contains carbonyl iron, and a carrier liquid for forming a suspension of the metal powder mixture. Beside the carbonyl iron, the metal powder mixture also contains aluminum.

In an exemplary embodiment of another aspect of the invention, a method for manufacturing an opaque silvery coating for a lamp having a glass envelope is also provided. In the method, a suspension comprising a mixture of carbonyl iron and aluminum powders in a carrier liquid is applied onto the envelope of the lamp. The suspension is dried, and thereafter the composition remaining from the suspension is burned at a temperature above 500° C.

The disclosed composition, when burned, provides an opaque coating on the glass which has a silvery appearance close to that of pure aluminum. The coating is very stable and tolerates temperatures up to 550° C. without any significant degradation of the mechanical or optical properties. This is also due to the fact that the coating contains exclusively inorganic components. Surprisingly, even when the known iron powder based coatings do appear mat and black, the coating made of the suggested composition appears to the human eye as having very pleasant silvery look, and even appear to be glossy to some extent. However, this silvery surface is quite mat (dull), and it is actually a diffuse surface that has a relatively low refraction coefficient. This means that substantially no light is reflected back towards the base of the lamp, and therefore no parasitic light effects will disturb the light beam projected from an automotive reflector where the lamp itself is mounted.

At the same time, the method to manufacture the coating is very simple, concerning both the components of the composition and the manufacturing steps employed. The application of the coating to the lamps, and their finishing treatment may be performed with standard, or at least very similarly constructed or only slightly modified lamp manufacturing equipment.

BRIEF DESCRIPTION OF DRAWINGS

The invention will be now described with reference to the enclosed drawings, where.

DETAILED DESCRIPTION OF THE INVENTION

Figure 1:
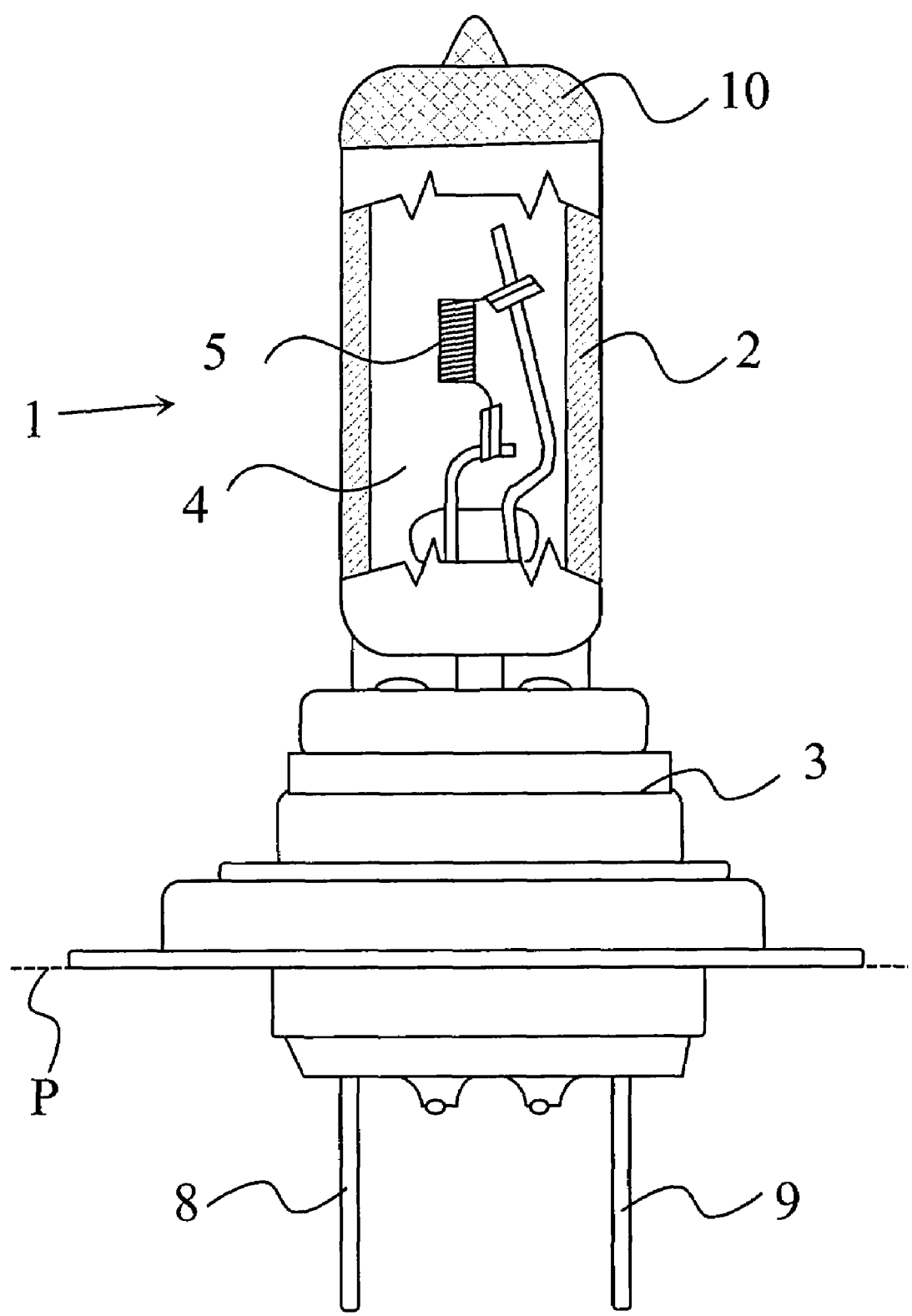
FIG. 1 is a side view of an automotive lamp with an opaque coating at the top.

Referring now to FIG. 1, there is shown an automotive lamp 1. The lamp 1 has a sealed lamp envelope 2 made of glass. The envelope 2 is supported by a metal lamp base 3, and the envelope 2 encloses a sealed inner volume 4 filled with a suitable gas, like argon, krypton or xenon. The inner volume 4 contains a tungsten filament 5, as usual with incandescent light sources. A pair of contacts 8,9 are located on the lower part of the lamp base 3. The lamp shown in FIG. 1 is an H7 type standard automotive lamp, but the proposed coating and method is applicable with all types of lamps, having one or more filaments and having a glass envelope.

On the top part of the lamp 1, there is provided a heat-resistant opaque coating 10, which is manufactured according to the method explained with reference to FIG. 2. The opaque coating 10 is manufactured in a single layer, which performs multiple functions. Its primary function is to shield the light emitted from the filament 5 from being emitted in certain directions. Secondly, the opaque coating 10 also has an aesthetic function, namely to present a colorless, or rather metallic appearance to the exterior when the lamp 1 is installed in an automotive reflector.

Figure 2:
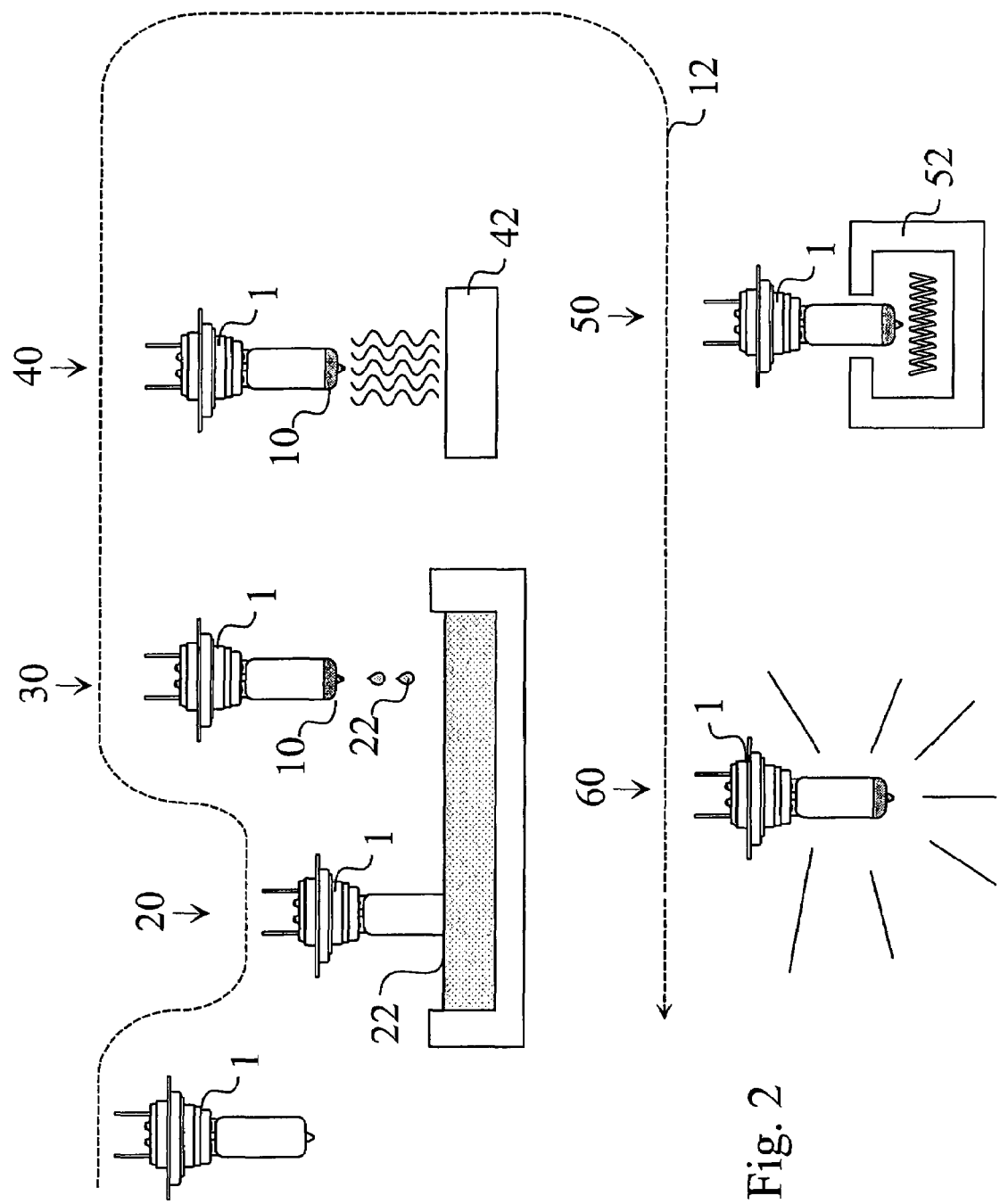
FIG. 2 illustrates the steps of a method for manufacturing the coating shown in FIG. 1.

Turning now to FIG. 2, there are shown only symbolically the steps of the method for manufacturing an opaque silvery coating for a lamp 1. The method is applicable for lamps 1 having a glass envelope 2, since the mechanical properties and long-term stability of the coating is partly based on the good bond between the iron in the coating and the glass.

The coating 10 is normally applied to the envelope 2 of the lamp 1 as the final step in the lamp manufacturing process, when the envelope 2 and thereby also the filament 5 has been aligned relative to the base plane P of the lamp base 3 and to the central axis of the lamp 1.

In the embodiment illustrated, at step 20 the coating 10 is applied onto the lamp 1 by dipping the lamp 1 into a suspension 22 with the composition as suggested herein.

The suspension 22 contains a mixture of two metal powders. One of the metal powders is carbonyl iron, while the other is aluminum. The two powders are mixed and a suspension 22 is formed with a suitable carrier liquid. The carbonyl iron content in the suspension is between 30 to 50% by weight, preferably between 33 to 39% by weight. The aluminum content in the suspension is between 15 to 30% by weight, preferably between 19 to 24% by weight. The preparation of such metal powder mixtures and a suspension thereof is known in the art, and may be performed, for example, by milling and grinding the metal powder components in a ball mill, similarly to the process described in U.S. Pat. No. 4,305,016.

The carrier liquid content in the suspension is between 30 to 50% by weight, preferably between 40 to 45% by weight. Advantageously, the carrier liquid is an organic liquid, such as ethanol, butanol or butylglycol. Preferably, the carrier liquid is n-butanol, which has a relatively low boiling temperature, and evaporates somewhat slower than other similar liquids, such as ethanol.

As mentioned above, the suspension 22 comprising the mixture of carbonyl iron and aluminum powders is applied onto the envelope of the lamp 1 by dipping the lamp 1 into the suspension 22. The moving of the lamp 1 is executed with a suitable lamp transporting and handling conveyor system, symbolized by the line 12, but otherwise not shown in detail. Such conveyor systems are also known per se.

Alternatively, it is also feasible to spray the suspension onto the envelope 2 of the lamp, using a mask for protecting the lower part of the envelope 2.

After the dripping of the excess suspension 22 at step 30, the suspension 22 forming the coating 10 is dried with a suitable known heating apparatus 42 at step 40. During the heating, the coating 10 is heated to temperatures not exceeding 400-450° C., preferably to a temperature of 200-250° C. Generally, the suspension 22 forming the coating 10 is dried until the carrier liquid substantially completely evaporates.

Following drying, at step 50 the composition remaining from the suspension is burned at a temperature above 500° C., preferably at a temperature between 600 to 650° C. This may be also done with known equipment, such as an electric furnace 52. Depending on the viscosity of the suspension 22, the thickness of the coating 10 is between 10-40 microns, so that the burning is completed in a relatively short time, such as 30 to 200 seconds. During the burning, the carbonyl iron transforms into iron oxide, which surrounds the aluminum particles in a substantially amorphous or polycrystalline matrix. Otherwise the aluminum and the iron do not form a compound, and no chemical bonds are created between the iron and the aluminum. However, the iron oxide is strongly bonded (cemented) to the glass material of the envelope 2.

After the burning at step 50, the coating 10 and also the lamp 1 is ready. If necessary, the lamp 1 may undergo further tests, such as indicated as step 60, for example for checking the light shielding properties of the coating 10.

EXAMPLE

A suspension containing 100 parts of aluminum, 170 parts of carbonyl iron, and 200 parts of n-butanol was prepared. The n-butanol and the iron were milled in a ball mill for 48 hours. The aluminum was added and the mixture was milled for another 2 hours. Thereafter the suspension was applied to a H4 automotive lamp by dipping it into the suspension, and dried with forced hot air at a temperature of 260° C. for 30 seconds. Burning the Fe-Al mixture for 100 seconds followed the drying. The burning was effected at continuously rising temperature, starting from 260° C. and ending at 640° C.

The finished lamps were subjected to aging tests by operating the lamps at increased voltage (14 V) for as long as 300 hours. The opaque silvery layer did not show any significant change or deterioration. The layer remained mechanically stable, did not flake off the glass, and also maintained its silvery appearance.

The invention is not limited to the shown and disclosed embodiments, but other elements, improvements and variations are also within the scope of the invention. For example, it is clear for those skilled in the art that beside basic components of the composition, further additives may be used to enhance the optical, visual, mechanical or aging properties of the coating. Further, a number of other organic carrier liquids may be suitable for making the suspension.

The invention claimed is:

1. A composition for the manufacture of an opaque silvery coating on a glass surface, comprising
   a mixture of at least two metal powders, the metal powder mixture containing carbonyl iron, and the metal powder mixture further containing aluminum, and
   a carrier liquid for forming a suspension of the metal powder mixture in which the carbonyl iron content in the suspension is between 30 to 50% by weight.

2. The composition of claim 1, in which the aluminum content in the suspension is between 15 to 30% by weight.

3. The composition of claim 1, in which the carrier liquid content in the suspension is between 30 to 50% by weight.

4. The composition of claim 1, in which the carrier liquid is an organic liquid.

5. The composition of claim 4, in which the carrier liquid is selected from the group containing ethanol, butanol or butylglycol.

6. The composition of claim 5, in which the carrier liquid is n-butanol.

7. A method for manufacturing an opaque silvery coating for a lamp having a glass envelope, comprising the steps of
   applying a suspension comprising a mixture of carbonyl iron and aluminum powders in a carrier liquid onto the envelope of the lamp,
   drying the suspension,
   burning the composition remaining from the suspension at a temperature above 500° C.

8. The method of claim 7, in which the remaining composition is burned at a temperature between 600 to 650° C.

9. The method of claim 7, in which the remaining composition is burned for 30 to 200 seconds.

10. The method of claim 7, in which the suspension is dried by heating to a temperature not higher than 450° C.

11. The method of claim 7, in which the suspension is dried until the carrier liquid substantially completely evaporates.

12. The method of claim 7, in which the suspension is applied to the envelope by spraying or dip coating.

* * * * *